United States Patent
Lepek

(10) Patent No.: US 7,605,617 B2
(45) Date of Patent: Oct. 20, 2009

(54) METHOD FOR SWITCHING A SYSTEM CLOCK AND CLOCK SYNCHRONIZATION UNIT

(75) Inventor: Paul Lepek, Langebruek (DE)

(73) Assignee: Atmel Automotive GmbH, Heilbronn (DE)

( * ) Notice: Subject to any disclaimer, the term of this patent is extended or adjusted under 35 U.S.C. 154(b) by 0 days.

(21) Appl. No.: 11/808,575

(22) Filed: Jun. 11, 2007

(65) Prior Publication Data

US 2008/0012612 A1    Jan. 17, 2008

(30) Foreign Application Priority Data

Jun. 9, 2006    (DE) .................. 10 2006 026 914

(51) Int. Cl.
*H03K 17/00* (2006.01)
*G06F 1/08* (2006.01)
(52) U.S. Cl. .................. 327/99; 327/298; 327/407
(58) Field of Classification Search ............ 327/99, 327/298, 407
See application file for complete search history.

(56) References Cited

U.S. PATENT DOCUMENTS

| 5,675,165 | A |   | 10/1997 | Lien |
| 5,864,564 | A | * | 1/1999 | Levitt et al. .................. 714/731 |
| 6,107,841 | A |   | 8/2000 | Goodnow |
| 6,341,355 | B1 |   | 1/2002 | Rutherford et al. |
| 6,873,183 | B1 |   | 3/2005 | Kaviani |
| 2002/0125914 | A1 |   | 9/2002 | Kim |
| 2004/0263217 | A1 |   | 12/2004 | Hutson et al. |

FOREIGN PATENT DOCUMENTS

| EP | 0 699 991 | 3/1996 |
| EP | 0 969 350 | 1/2000 |
| WO | WO-01/59550 | 8/2001 |

* cited by examiner

*Primary Examiner*—Lincoln Donovan
*Assistant Examiner*—Daniel Rojas
(74) *Attorney, Agent, or Firm*—Muncy, Geissler, Olds & Lowe, PLLC

(57) ABSTRACT

A clock synchronization unit is provided for an electronic system, particularly for a microprocessor, that includes a first input for a first clock signal, a second input for a second clock signal, a third input for a select control signal, and an output for a system clock signal. A first control module controlled by the first clock signal, a second control module controlled by the second clock signal and connected to the first control module in terms of signaling technique is also provided. The first control module upon application of a predefined signal level of the select control signal at the third input synchronously with the first dock signal, is designed to set the system clock signal from the first clock signal to a predefined logic signal level as the system clock hold signal, and the second control module is designed, synchronously with the second clock signal, to reset the system clock hold signal and to cause an output of the second clock signal as the system clock signal.

15 Claims, 12 Drawing Sheets

$A = (cnt\,1 \leq TVAL\,1)$ $B = (cnt\,1 = 00000001)$

| INPUT | | | | OUTPUT |
|---|---|---|---|---|
| Zustand | POR | Flag 1 | Flag 2 | hold |
| 1 | 1 | 0 | 0 | 0 |
| 2 | 0 | 0 | 0 | hold 1 or hold 2 |
| 3 | 0 | 1 | 0 | hold 1 or hold 2 |
| 4 | 0 | 0 | 1 | hold 1 or hold 2 |

FIG. 14

| INPUT | | | | | | OUTPUT |
|---|---|---|---|---|---|---|
| CLK_A | CLK_B | POR | hold | CLK A Gate 2 | CLK B Gate 1 | SYS_CLK |
| x | x | 1 | x | x | x | 1 |
| x | x | 0 | 1 | x | x | 1 |
| x | x | 0 | 0 | 1 | 0 | CLK_A |
| 1 | 1 | 0 | 0 | 0 | 1 | CLK_B |

FIG. 15

METHOD FOR SWITCHING A SYSTEM CLOCK AND CLOCK SYNCHRONIZATION UNIT

This nonprovisional application claims priority under 35 U.S.C. §119(a) to German Patent Application No. DE 102006026914, which was filed in Germany on Jun. 9, 2006, and which is herein incorporated by reference.

BACKGROUND OF THE INVENTION

1. Field of the Invention

The present invention relates to a method according for switching a system clock from a first clock signal to a second clock signal, whereby the switching process is triggered by a select control signal and the switching occurs synchronously to the first and/or second clock signal.

Furthermore, the present invention relates a clock synchronization unit for an electronic system, particularly for a microprocessor having a first input for a first clock signal, a second input for a second clock signal, a third input for a select control signal, and an output for a system clock signal.

In addition, the present invention relates to a processor unit and use of the method of the invention.

2. Description of the Background Art

To control electronic systems, such as a processor unit in the form of a microprocessor, it is normally necessary to make an application-specific selection from a plurality of externally applied asynchronous clock signals. In so doing, depending on the requirement profile, a routine switching among different clock signals to output an accordingly changed system clock signal may be necessary. A switching process of this kind is also necessary, however, especially when one of the external clock signals is incorrect or when an appropriate external clock signal source totally fails.

U.S. Pat. No. 6,873,183 B1 discloses a method and a circuit arrangement for switching a system clock, in which the clock switching from a first clock signal to a second clock signal as a system clock signal occurs asynchronously. According to the disclosure therein, in line with a switch select signal, the clock signal definitive until then as the system clock is immediately "frozen" by an asynchronous state machine, i.e., asynchronously independent of its current state. Then, by means of a known detector, which normally has special, i.e., non-standard analog circuit elements, the time of transition to the other clock signal, to which the switching is to occur, is determined in the "frozen" state, whereupon the clock signal at this time is switched by the asynchronous state machine from the "frozen" state to the new clock signal, as a result of which undesired spikes in the system clock switching can be avoided.

The previously described circuit arrangement and the method executable with its use have the shortcoming that due to the employed analog circuit elements the synthesis capability by means of common (software) synthesis tools is insufficient, and, moreover, the at least partially analog embodiment of the current asynchronous state machine requires high outlays during manufacture, which makes itself felt in corresponding cost-related disadvantages. In addition, because of the described asynchronous operating mode during switching, clock stretching and shortening occur, which have a negative effect on the behavior of electronic systems controlled by the system clock signal, such as, for example, a microprocessor.

U.S. Pat. No. 5,675,165 and U.S. Pat. No. 6,107,841, however, disclose devices and methods for the synchronous switching of clock signals, which, however, according to the embodiment described therein, can be used in particular only in a relatively limited and inflexible manner. In particular, the subject matter of U.S. Pat. No. 5,675,165, in addition, disadvantageously is excessively complex, because its operating mode is made dependent on a switching direction of the system clock (from high to low frequency or vice versa).

SUMMARY OF THE INVENTION

It is therefore an object of the present invention to provide a method and a device of the specifically aforementioned type to the effect that these manage without complex arrangements of circuit elements, particularly analog circuit elements, so that particularly less costly manufacture and improved synthesis capability are achieved, whereby, moreover, no undesirable clock shortening or stretching is to occur during a switching process. In addition, an applicability as unlimited and flexible as possible is to be assured.

According to the invention, a method for switching a system clock from a first clock signal to a second clock signal, whereby the switching process is triggered by a select control signal and the switching occurs synchronously to the first and/or second clock signal, is characterized in that the clock control is transferred from a predefined edge of the first clock signal to a corresponding edge of the second clock signal, whereby in accordance with the first clock signal, a system clock signal is held at a first predefined logic signal level as the system clock hold signal, whereby a corresponding edge of the second clock signal is awaited, and whereby in accordance with the second clock signal, the system clock hold signal is reset to a second logic state and at the same time, the system clock signal is reactivated with use of the second clock signal. In this manner, the system clock switching process is in fact triggered or activated by the select control signal, but then occurs completely in accordance with the first and second clock signals, which synchronously among each other hand themselves over to clock control according to the previously outlined interaction.

Accordingly, a clock synchronization unit of the invention is provided for an electronic system, particularly for a microprocessor, having: a first input for a first clock signal, a second input for a second clock signal, a third input for a select control signal, and an output for a system clock signal, characterized by a first control module, controlled by the first clock signal and a second control module, controlled by the second clock signal and connected to the first control module in terms of signaling technology, whereby the first control module, upon application of a predefined signal level of the select control signal at the third input synchronously with the first clock signal, is designed to set the system clock signal from the first clock signal to a predefined logic signal level as the system clock hold signal and whereby the second control module is designed, synchronously with the second clock signal, to reset the system clock hold signal and to cause an output of the second clock signal as the system clock signal.

A principle of the present invention is thereby that the switching of a system clock signal from a first clock signal to a second clock signal occurs synchronously to at least one of the first and second clock signals, as a result of which the previously mentioned undesirable clock shortening and stretching can be avoided. The clock synchronization unit of the invention is designed to carry out a synchronous switching process of this type in such a way that a completely digital realization is possible, which results in the sought cost reduction and improved synthesis capability.

In the course of another embodiment of the method of the invention, there is provided that in accordance with the select control signal, a first clock hold signal is generated synchronously to the first clock signal by a first control module for the first clock signal, the first clock hold signal is relayed to a second control module for the second clock signal, a second clock hold signal is generated by the second control module synchronously to the second clock signal, the system clock hold signal is generated from the first and second clock signals, the second clock hold signal is relayed to the first control module, and a state of the first clock hold signal is changed depending on the relayed second clock hold signal.

In this way, the first and second control modules as part of a master-slave dependence perform a so-called handshake operation, to inform themselves mutually in a synchronous manner of the triggered switching process and to undertake the switching of the system clock.

In a development of the clock synchronization unit of the invention, there is provided for executing the previously already explained handshake operation that the first control module is designed in accordance with the select control signal to generate a first clock hold signal and to relay the same to the second control module, the second control module is designed upon receipt of the first clock hold signal to generate a second clock hold signal and to relay the same to the first control module, the first control module is designed to reset the first clock hold signal upon receipt of the second clock hold signal, and the second control module is designed to reset the second clock hold signal.

Furthermore, to generate the system clock hold signal, another development of the clock synchronization unit of the invention provides a circuit element which is designed to generate a global clock hold signal as a precursor of the system clock hold signal from at least the first and second clock hold signals. The particular circuit element can thereby be designed in particular as an OR logic gate. In other words: a clock hold signal is transferred by the OR gate from a first time domain (for example, the domain of the first clock signal) to a second time domain (domain of the second clock signal).

Optionally, in this case, in a development of the method of the invention, it can be provided that a time since the application of the select control signal is determined and that the switching of the system clock signal is released when a predefined time threshold is reached. In this case, the time threshold can be predefined particularly by a user in the course of software configuration of a system to be controlled.

A corresponding development of the clock synchronization unit of the invention provides that at least the first control module has a counter, which is designed to determine a time depending on the select control signal.

In a system in which the origin of a clock source is not predictable or determinable in a simple manner, it can occur that the clock source or the corresponding clock signal of a notified switching process is no longer available, because, for example, the input line was separated, or total failure of the source has occurred. To avoid switching to a failed or incorrect clock, it is provided according to the invention to identify and to confirm a new clock source or a new clock, to which the switching is to occur, before the actual clock switching occurs. This occurs according to the invention by the turning on or release of a safety function (timeout function).

The safety/timeout function is a simple mechanism, which searches for a predefined sampling edge, particularly a rising edge, of the new (system) clock signal, before the actual switching process occurs, and which permits the switching only when the named predefined edge falls within a predefined time interval, which is monitored by a respective counter. The counter establishes a time interval within which the slave control module can generate a feedback clock hold signal to be confirmed by the master control module. When the feedback signal is not received within the specified time, the master control module cancels its originally set clock hold signal and the clock switching process is aborted.

Alternatively or in addition, a suitable timeout logic can also be used as a means for detecting and controlling a clock switching delay interval, whereby the clock switching delay can be determined in units of periods of the primary system clock signal, i.e., the clock signal that currently functions as the system clock signal.

In order to prevent an attempted switching of the system clock signal during a specific time period, especially before the optional reaching of the counter end value, in the course of another embodiment of the clock synchronization unit of the invention, it is provided that at least the first control module is designed to generate a clock switching block signal depending on the select control signal, which is applied at the second control module to prevent resetting of the system clock hold signal.

Moreover, in a development of the clock synchronization unit of the invention, it is provided in an advantageous manner that the first control module is designed to turn off the clock switching block signal when a predefined time threshold is reached.

Preferably, the time threshold is at least $2 \cdot T_s$, where $T_s$ designates a cycle duration of the second clock signal (secondary clock signal). This type of boundary condition is important particularly when the first and second clock signals, between which the switching is to occur, have a cycle duration considerably different from each other, so that a respective selected time threshold must assure that a respective edge of the second clock signal is found within the thus defined time window.

In a corresponding development of the clock synchronization unit of the invention, it is provided that the time threshold can be predefined by the user particularly by means of software, whereby the time threshold is especially at least $2 \cdot T_s$, where $T_s$ designates a cycle duration of the second clock signal.

In addition, it can be provided optionally that a switching process is interrupted, when a corresponding edge of the second clock signal, which is awaited, does not occur at all or does not occur within a predefined time window, which indicates, for example, a failed clock source. In this regard, the switching command is held and the previous (first) clock signal is maintained as the system clock. In terms of device engineering, an additional counter in particular can be provided for this purpose. Advantageously, however, only a single counter is used to activate the second clock signal, as previously described, and to preset a time window for a failure-proof clock switching.

Another development of the method of the invention provides that the first and second clock signals are each selected from a plurality of clock signals. In this way, an optimal, application-specific switching of system clock signals is possible.

In a corresponding development of the clock synchronization unit of the invention, said unit has a multiplexer functionally connected to the first and second inputs, which are designed to select the first and second clock signal each from a plurality of clock signals.

The clock synchronization unit of the invention can be used advantageously particularly in a processor unit, particularly in a microprocessor, for controlling the same. Accordingly, a preferred use of the method of the invention results for switching the system clock in a processor unit, particularly in a microprocessor.

In this way, the present invention within the stated embodiments creates a clock switching or synchronization unit, which is capable of switching in a synchronous manner from a (first) clock source to another (second) clock source. According to the foregoing, the unit has for this purpose primarily at first means for selecting a new (second) clock source, whose clock signal is to be used as a system clock signal. Furthermore, the unit has asynchronously operating means for sampling a clock input, which, with use of crosswise coupled synchronization blocks (control modules), generates a number of control/status signals, particularly clock hold signals. In addition, the unit has means for asynchronous querying of the control signals (clock hold signals) in order to generate from these a higher-order global clock hold signal. As long as it is activated, it stops the system clock ("freezing" of the system clock). A clock switching delay can be controlled by means of an internal timer. Moreover, within the scope of the present invention, error protection can be provided, which recognizes a definitive feature of the second clock signal and accordingly decides whether switching to the new (second) clock signal is to occur.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 14 illustrates a tabular overview of possible states of an output signal of a state decoder in a clock synchronization unit of the invention as a function of possible input values;

FIG. 15 illustrates in tabular form the output of the clock gate in FIG. 2 as a function of the applied input signals;

DETAILED DESCRIPTION

Figure 1:
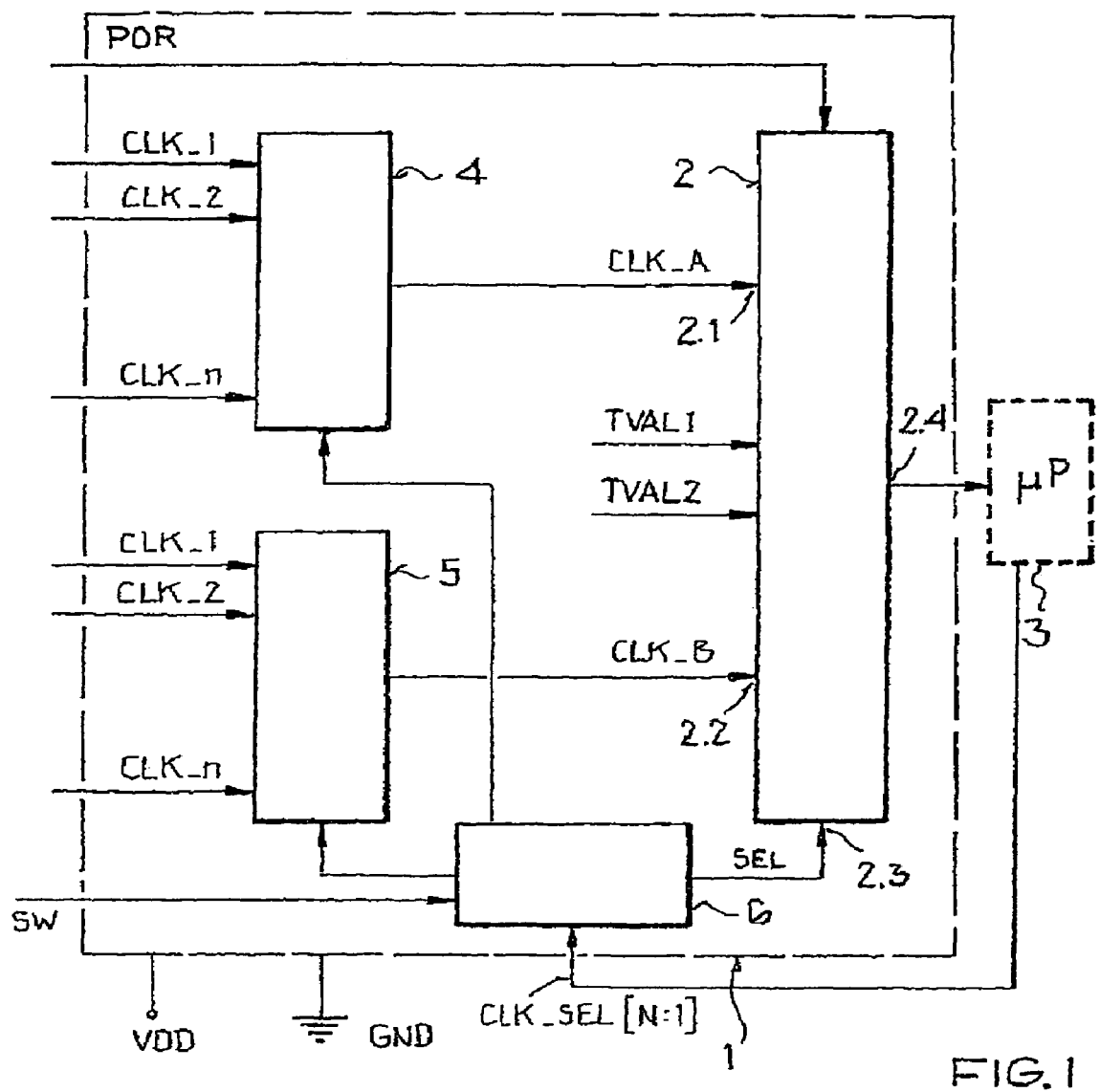
FIG. 1 illustrates a schematic block diagram of a circuit arrangement with a clock synchronization unit of the invention for an electronic system for use with or in a microprocessor.

Using a schematic block diagram, FIG. 1 shows an embodiment of a circuit arrangement 1, which has inter alia a clock synchronization unit 2 of the invention and which is provided for use with a processor unit, such as a microprocessor 3. Contrary to the depiction in FIG. 1, circuit arrangement 1 with clock synchronization unit 2 of the invention may be also integrated into processor unit 3.

In addition to the already mentioned clock synchronization unit 2, circuit arrangement 1 according to FIG. 1 has a first multiplexer 4 and a second multiplexer 5, which have a functional signaling connection to clock synchronization unit 2. First multiplexer 4 has n inputs for external clock signals CLK_1, CLK_2, . . . , CLK_n, and second multiplexer 5 also has n inputs for external clock signals CLK_1, CLK_2, . . . , CLK_n. Furthermore, circuit arrangement 1 according to FIG. 1 has a control unit 6, which has a functional signaling connection to first and second multiplexers 4, 5 and also to clock synchronization unit 2. Moreover, another input POR for a reset signal (power-on-reset) is provided at least at clock synchronization unit 2. Clock synchronization unit 2 has a first input 2.1, a second input 2.2, and a third input 2.3. Moreover, clock synchronization unit 2 has an output 2.4, and other terminals for a supply voltage VDD, a reference potential (ground) GND, and for (user) input values TVAL1, TVAL2, which will be discussed further hereafter.

A first control signal CLK_SEL[n:1] and a second control signal SW are applied at control unit 6. First control signal CLK_SEL[n:1] is supplied by processor unit 3 or, contrary to the embodiment of FIG. 1, by another external unit (not shown) and may be asynchronous in regard to the clock signals CLK_1, CLK_2, . . . , CLK_n. The second (external) control signal SW activates optionally the initiation of a clock switching to the clock signal CLK_1, CLK_2, . . . , CLK_n determined by the first control signal CLK_SEL[n:1].

A first clock signal CLK_A, which was selected by first multiplexer 4 in accordance with control unit 6 from the externally predefined number of clock signals CLK_1, . . . , CLK_n, is applied at first input 2.1 of clock synchronization unit 2. Accordingly, a different second clock signal CLK_B, which was selected by second multiplexer 5 in accordance with control unit 6 from the externally predefined number of control signals CLK_1, . . . , CLK_n and which is asynchronous to the first clock signal, is applied at input 2.2 of clock synchronization unit 2. A switch signal provided by control unit 6 or select control signal SEL, which triggers a switching process for switching a system clock according to the invention, is applied at third input 2.3 of clock synchronization unit

2, as will be described in greater detail hereafter. A system clock signal SYS_CLK is outputted to processor unit 3 at output 2.4 by clock synchronization unit 2, whereby the system clock signal SYS_CLK may also be a system clock hold signal, as will also be described in greater detail hereafter.

The switching process triggered by control unit 6 by means of the select control signal SEL can be caused particularly by faultiness or total failure of a current system clock generator (clock) or arbitrarily by corresponding input, for example, by a user, which is known to the person skilled in the art.

Figure 2:
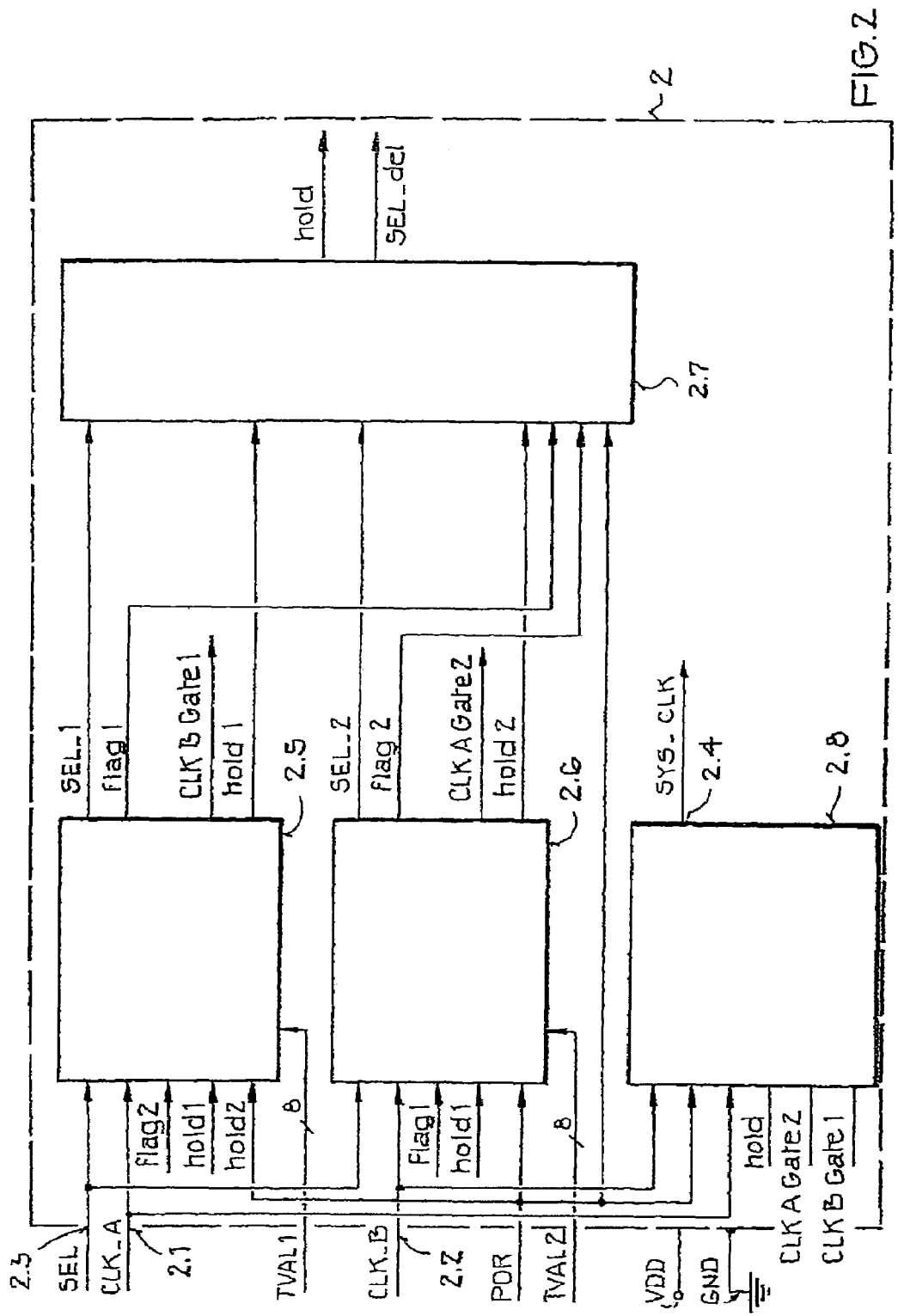
FIG. 2 illustrates a detailed block diagram of a first embodiment of the clock synchronization unit of the invention.

FIG. 2 with the detailed block diagram shows an embodiment, according to the invention, of clock synchronization unit 2 according to FIG. 1. The same elements or elements with a similar function are provided with the same reference characters here as in FIG. 1.

Clock synchronization unit 2 according to FIG. 2 has two structurally identical control modules, namely, a first control module (synchronizer) 2.5 and a second control module (synchronizer) 2.6. In addition, clock synchronization unit 2 has two additional circuit elements in the form of a process multiplexer (synchronization state decoder) 2.7 and a logic element (clock gate) 2.8, whereby the latter is made at present as an OR gate.

First control module 2.5 is connected to input 2.1 of clock synchronization unit 2, so that the first clock signal CLK_A is applied at it. Second control module 2.6 is connected to input 2.2 of clock synchronization unit 2, so that the second clock signal CLK_B is applied at it. The switch signal or select control signal SEL is applied both at first control module 2.5 and at second control module 2.6. Both control modules 2.5, 2.6, moreover, have an input for the reset signal POR. In the shown exemplary embodiment, a counter element TVAL1 or TVAL2, i.e., an appropriate time interval, can also be preset for each control module (compare FIG. 1), which will be discussed in greater detail hereafter.

According to the diagram in FIG. 2, control module 2.5 is designed to output a clock switching block signal flag1; accordingly, the control module is designed to output a clock switching block signal flag2. Furthermore, control modules 2.5, 2.6 are each designed to output a gate signal ClkBGate1 or ClkAGate2. Furthermore, control modules 2.5, 2.6 are each designed to output a clock hold signal hold1 or hold2 and to output a first or second select signal SEL_1 or SEL_2.

Most of the previously listed output signals, i.e., the output signals SEL_1, SEL_2, hold1, hold2, flag1, flag2 of first and second control modules 2.5, 2.6 are applied at the respective inputs of process multiplexer 2.7, as shown in FIG. 2. Moreover, the clock switching block signal flag1 of first control module 2.5 and the clock hold signal hold1 of first control module 2.5 are applied at respective additional inputs of second control module 2.6, as also shown in FIG. 2. Accordingly, the clock switching block signal flag2 and the clock hold signal hold2 of second control module 2.6 are applied at respective additional inputs of first control module 2.5, so that control modules 2.5, 2.6 are coupled to one another.

The output signals ClkBGate1 and ClkAGate2 are applied at clock gate 2.8.

Process multiplexer 2.7 generates from its input signals, which according to FIG. 2 include, furthermore, the reset signal POR, as output signals a delayed select signal SEL_del and a hold signal hold. The former, together with the reset signal POR and the already mentioned gate signals ClkBGate1, ClkAGate2 and the first and second clock signals CLK_A, CLK_B, forms the input signals for the OR gate (clock gate) 2.8, which therefrom outputs the system clock signal SYS_CLK at its output or output 2.4 of clock synchronization unit 2 of the invention.

Figure 3:
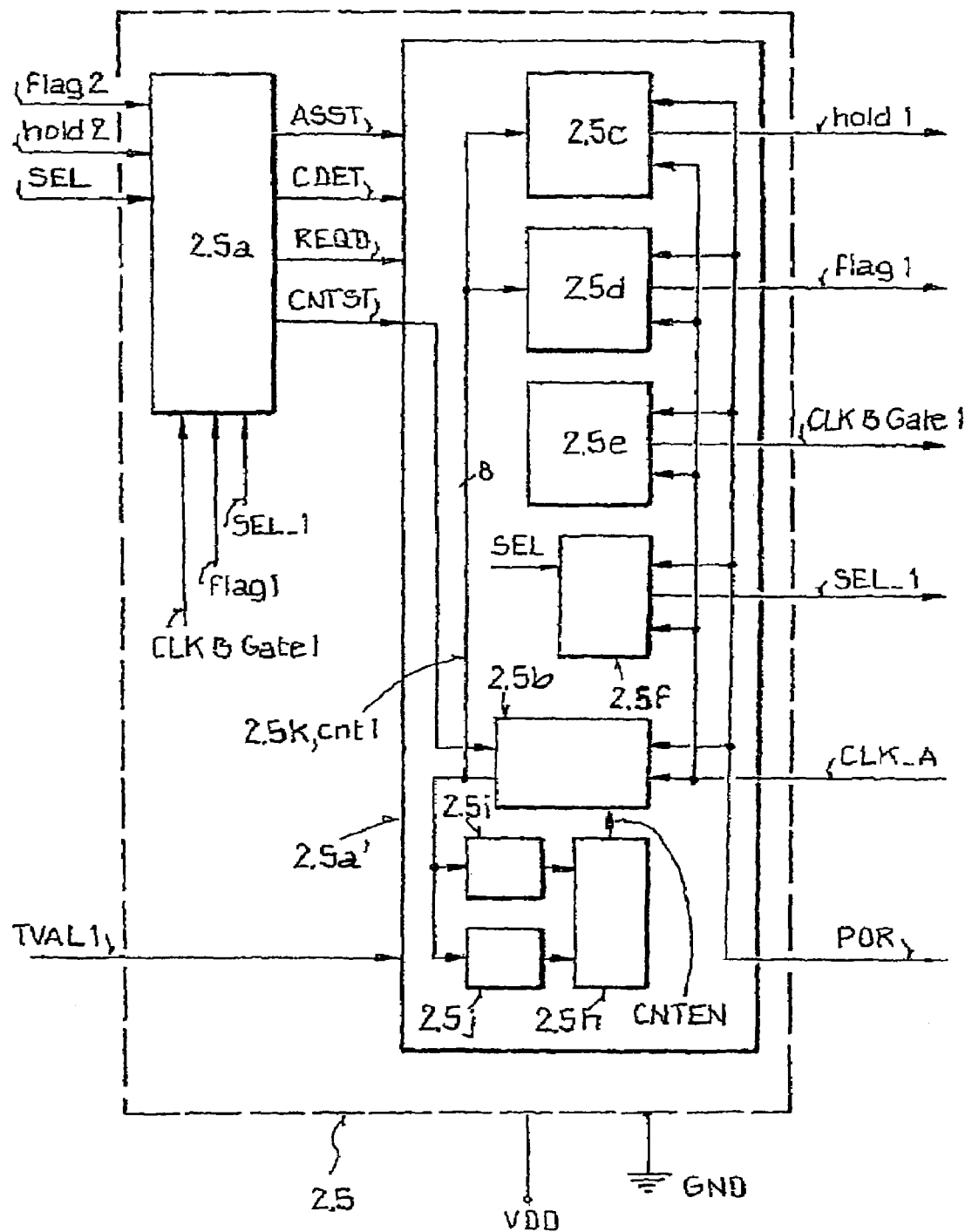
FIG. 3 illustrates a detailed block diagram of a first control module for the clock synchronization unit according to FIG. 2.

FIG. 3 is a detailed block diagram of a first control module of the clock synchronization unit according to FIGS. 2 and 3 [sic] shows a detailed drawing of first control module 2.5. It is emphasized that second control module 2.6 is made structurally identical, so that at present a likewise detailed description of the same can be omitted.

First control module 2.5 and accordingly second control module 2.6 (not shown here) include a control block 2.5a, and a state machine 2.5a', which in turn has a counter 2.5b, a hold signal control unit 2.5c, a block signal control unit 2.5d, and a gate control unit 2.5e.

Furthermore, state machine 2.5a' has a select control unit 2.5f and a counter control unit 2.5h and two comparators 2.5i, 2.5j.

The clock switching block signal flag2, generated by the second control module (not shown), the clock hold signal hold2, likewise generated by the second control module, and the switch signal SEL are applied at control block 2.5a of first control module 2.5. Furthermore, the internal clock switching block signal flag1, i.e., generated within the shown first control module 2.5, the gate signal ClkBGate1, and the select signal SEL_1 are applied at control block 2.5a.

Control block 2.5 outputs the control signals ASST, CDET, REQD, and CNTST, which will be discussed in greater detail hereafter. The aforementioned control signals of control block 2.5a are applied at state machine 2.5a', as shown in FIG. 3.

In state machine 2.5a', counter 2.5b generates a counter signal or a counter value cnt1, which is supplied via an 8-bit line 2.5k both to hold signal control unit 2.5c and block signal control unit 2.5d, and to comparators 2.5i, 2.5j.

The hold signal control unit 2.5c generates the clock hold signal hold1. The block signal control unit 2.5d generates the clock switching block signal flag1. The gate control unit 2.5e generates the gate signal ClkBGate1. The select control unit 2.5f generates the select signal SEL_1. The counter control unit 2.5h generates a counter release signal CNTEN.

Furthermore, both the first clock signal CLK_A and the reset signal POR are applied at all control units 2.5c-2.5f, with the exception of counter control unit 2.5h, as well as at counter 2.5b.

The comparators 2.5i, 2.5j have a functional signaling connection to counter control unit 2.5h. Moreover, the switch signal SEL and the select signal SEL_1 are applied at the select control unit 2.5f. FIGS. 4a-d show logic circuit diagrams for depicting the generation of control signals in a control block according to FIG. 3.

Figure 4A:
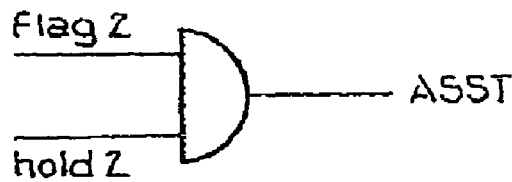
FIGS. 4a-d illustrate logic circuit diagrams for depicting the generation of control signals in a control block according to FIG. 3.

According to FIG. 4a, the signals flag2 and hold2 are linked by means of an AND logic gate to generate the control signal ASST, i.e., the control signal ASST has the value "1" (high logic level), when both the clock switching block signal flag2 and the clock hold signal hold2 have a high logic level.

Figure 4B:
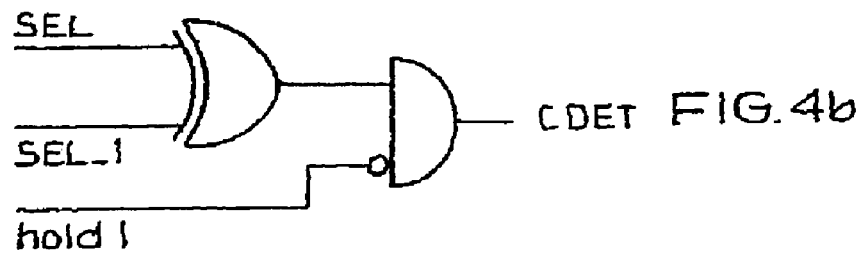

According to FIG. 4b, the control signal CDET is generated by linking the clock hold signal hold1 in inverted form via an AND logic gate with the output of an exclusive OR gate, whereby the select signal SEL or the select signal SEL_1 is applied at the inputs of the exclusive OR gate. In this way, the control signal CDET has a high logic level, when either the select signal SEL or the select signal SEL_1 has a high logic level and directly the clock hold signal hold1 has a low logic level.

Figure 4C:
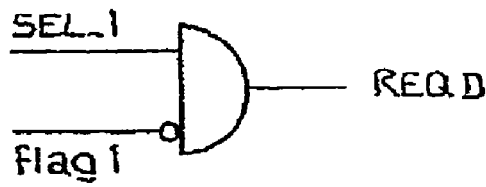

According to FIG. 4c, the control signal REQD is generated by linking the select signal SEL_1 via an AND logic gate with the inverted clock switching block signal flag1. In this way, the control signal REQD has a high logic level, when the select signal SEL_1 has a high logic level and the clock switching block signal flag1 has a low logic level.

Figure 4D:
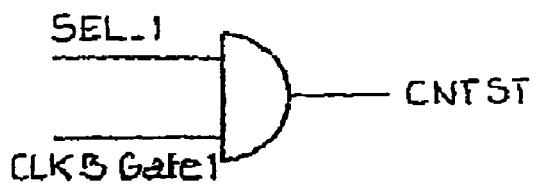

According to FIG. 4d, the control signal CNTST is generated by ANDing the select signal SEL_1 and the gate signal ClkBGate1. In this way, the control signal CNTST has a high logic level, when both the select signal SEL_1 and the gate signal ClkBGate1 have a high logic level.

The logic circuits of FIGS. 4a-d together produce control block 2.5a according to FIG. 3.

Figure 5:
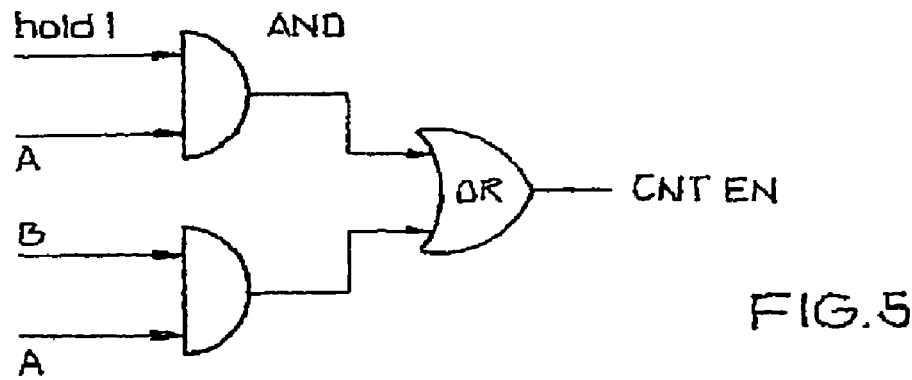
FIG. 5 illustrates a logic circuit diagram for depicting the generation of a counter release signal in FIG. 3.

FIG. 5 shows in detail a logic circuit arrangement of counter control unit 2.5h in FIG. 2. According to FIG. 5, the counter release signal CNTEN is generated by first ANDing the clock hold signal hold1 with a signal A. In this case, signal A represents an output of comparator 2.5i, which compares the counter value cnt1 of counter 2.5b with the predefined end value TVAL1 (compare FIGS. 1 and 2) and outputs a high logic level, when the following applies: cnt1≦TVAL1. Furthermore, signal A is ANDed with another signal B, whereby signal B has a high logic level, when the following applies: cnt1="00000001". The results of the previously explained ANDings in FIG. 5 are then ORed, so that the counter release signal CNTEN has a high logic level, when either the ANDing of signals hold1 and A or the ANDing of signals A and B produces a high logic level.

The statements made in regard to FIGS. 4a-d and 5 apply accordingly to second blocking module 2.6 (FIGS. 1 and 2) when the specific signals, particularly signals hold1, flag1, hold2, flag2, cnt1, TVAL1, SEL_1, and ClkBGate1, are replaced by the respective signals for second control module 2.6 (compare FIG. 2).

Figure 6:
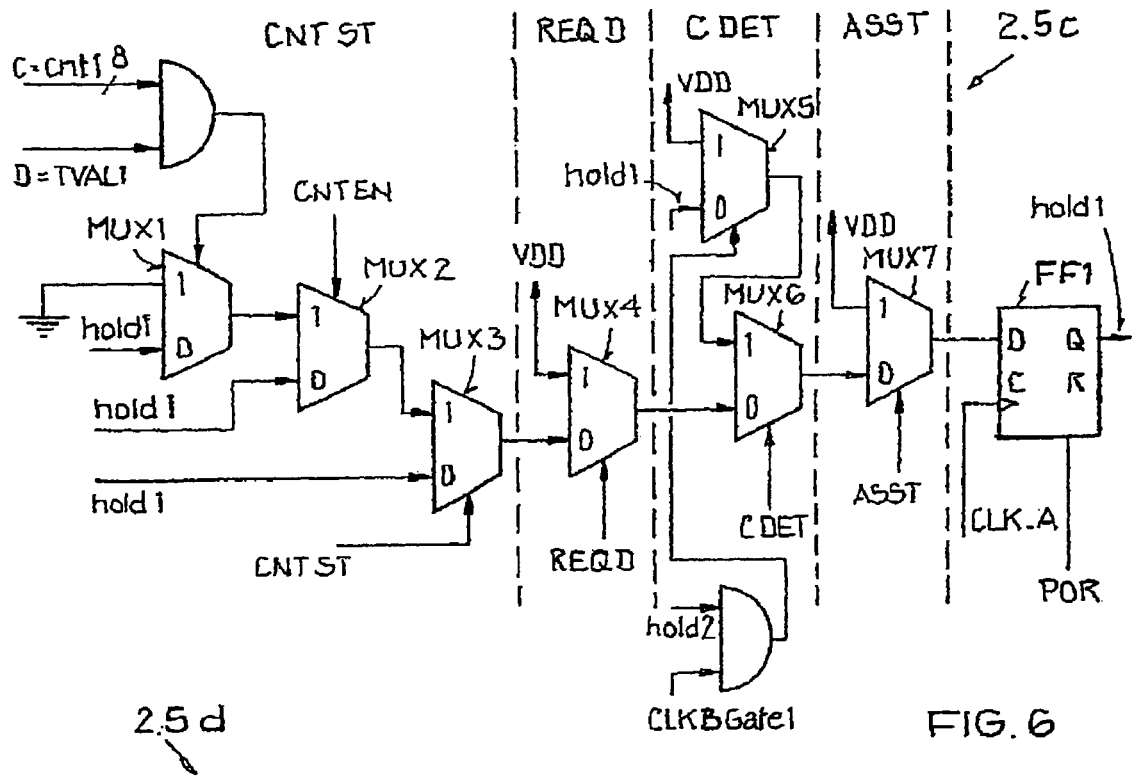
FIG. 6 illustrates in detail a circuit design for generating a clock hold signal.

FIG. 6 shows in detail a circuit design for generating a clock hold signal. A circuit design is shown in particular for hold signal control unit 2.5c (FIG. 3). The circuit arrangement depicted in FIG. 6 is substantially made of a sequence of 2-to-1 multiplexers MUX1-MUX7. These function as change-over switches that switch between their two specific inputs in accordance with a specifically applied control or address signal. In this case, depending on the logic level of the address signal, either the signal applied at the multiplexer input designated by "0" (low logic level of the address signal) or the signal applied at the multiplexer input designated by "1" (high logic level of the address signal) is outputted. In the following text, the "0" input of multiplexer MUXi is also designated by E0 and the specific "1" input of multiplexer MUXi by E1.

At the first multiplexer MUX1, the clock hold signal hold1 is applied at E0, whereas E1 is at the ground potential GND. The address signal for MUX1 is generated by an ANDing of signals C and D, whereby C designates the counter value cnt1 and D the set counter end value TVAL1. The output of multiplexer MUX1 is connected to input E1 of multiplexer MUX2. The clock hold signal hold1 is again applied at input E0 of multiplexer MUX2. The address signal for multiplexer MUX2 is formed by the control signal CNTEN (compare FIGS. 3 and 5). The output of multiplexer MUX2 is connected to input E1 of multiplexer MUX3, whereas the clock hold signal hold1 is again applied at input E0 of multiplexer MUX3. The address signal for multiplexer MUX3 is formed by the control signal CNTST (compare FIGS. 3 and 4d). The output of multiplexer MUX3 is connected to input E0 of multiplexer MUX4, at whose input E1 the voltage supply signal VDD is applied. The address signal for multiplexer MUX4 is formed by the control signal REQD (compare FIGS. 3 and 4c). The output of multiplexer MUX4 is connected to input E0 of multiplexer MUX6. Input E1 of multiplexer MUX6 is connected to the output of multiplexer MUX5, at whose input E0 the clock hold signal hold1 is applied and at whose input E1 the voltage supply signal VDD is again applied. The address signal for multiplexer MUX5 is formed by ANDing of the inverted clock hold signal hold2 (compare FIG. 2) and the inverted gate signal ClkBGate1 (compare FIGS. 2 and 3).

The address signal for multiplexer MUX6 is formed by the control signal CDET (compare FIGS. 3 and 4b). The output of multiplexer MUX6 is connected to input E0 of multiplexer MUX7, at whose input E1 the voltage supply signal VDD is applied. The address signal for multiplexer MUX7 is formed by the control signal ASST (compare FIGS. 3 and 4a). The output of multiplexer MUX7 is connected to the data input D of a flip-flop FF1. Flip-flop FF1 is realized as a clock-controlled or clocked flip-flop. The first clock signal CLK_A is applied at its clock input C. The reset input R of flip-flop FF1 is connected to the reset signal POR. Flip-flop FF1 outputs the clock hold signal hold1 at the output Q.

Figure 7:
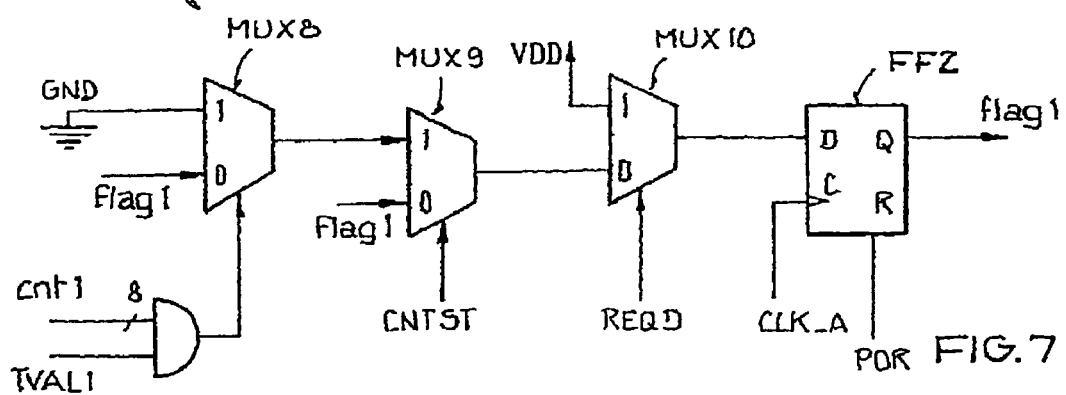
FIG. 7 illustrates in detail a circuit arrangement for generating a clock switching block signal.

FIG. 7 shows in detail a circuit arrangement for generating a clock switching block signal. The circuit arrangement, shown in FIG. 7, takes over the function of block signal control unit 2.5d in FIG. 3. It includes querying of 2-to-1-multiplexers MUX8-MUX10, which function as change-over switches and each have inputs E0, E1, an address or input control input, and an output. The clock switching block signal flag1 is applied at input E0 of multiplexer MUX8, whereas input E1 is at ground potential GND. The address signal for multiplexer MUX8 is formed by ANDing of the signals cnt1 and TVAL1 (compare FIG. 6). The output of multiplexer MUX8 is connected to input E1 of multiplexer MUX9, at whose input E0 the clock switching block signal flag1 is again applied. The address signal for multiplexer MUX9 is formed by the control signal CNTST (compare FIGS. 3 and 4d). The output of multiplexer MUX9 is connected to input E0 of multiplexer MUX10, at whose input E1 the voltage supply signal VDD is applied. The address signal for multiplexer MUX10 is formed by the control signal REQD (compare FIGS. 3 and 4c). The output of multiplexer MUX10 is connected to the data input D of a flip-flop FF2, at whose clock input the clock signal CLK_A is applied. The reset signal POR is applied at the reset input R of flip-flop FF2, whereas the clock switching block signal flag1 is outputted at output Q of flip-flop FF2.

Figure 8:
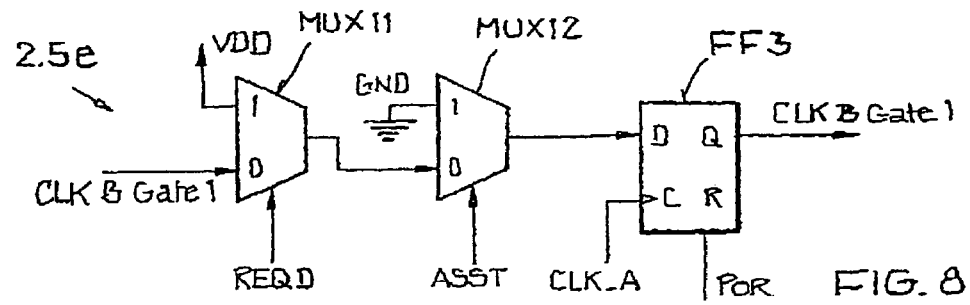
FIG. 8 illustrates in detail a circuit arrangement for generating a gate signal.

FIG. 8 shows in detail a circuit arrangement for generating a gate signal. The circuit arrangement according to FIG. 8 corresponds to gate control unit 2.5e in FIG. 3. It is formed substantially of a sequence of 2-to-1-multiplexers (change-over switches) MUX11, MUX12. The gate signal ClkBGate1 is applied at input E0 of multiplexer MUX12, whereas the voltage supply signal VDD is applied at input E1 of multiplexer MUX11. The output of multiplexer MUX11 is connected to input E0 of multiplexer MUX12, whose input E1 is at ground potential GND. The address signal for multiplexer MUX12 is formed by the control signal ASST (FIGS. 3 and 4a), whereas the address signal for multiplexer MUX11 is formed by the control signal REQD (FIGS. 3 and 4c).

The output of multiplexer MUX12 is connected to the data input D of a flip-flop FF3, at whose clock input C the clock signal CLK_A is applied. The reset signal POR is applied at the reset input R of flip-flop FF3. Flip-flop FF3 outputs the gate signal ClkBGate1 at an output Q.

Figure 9:
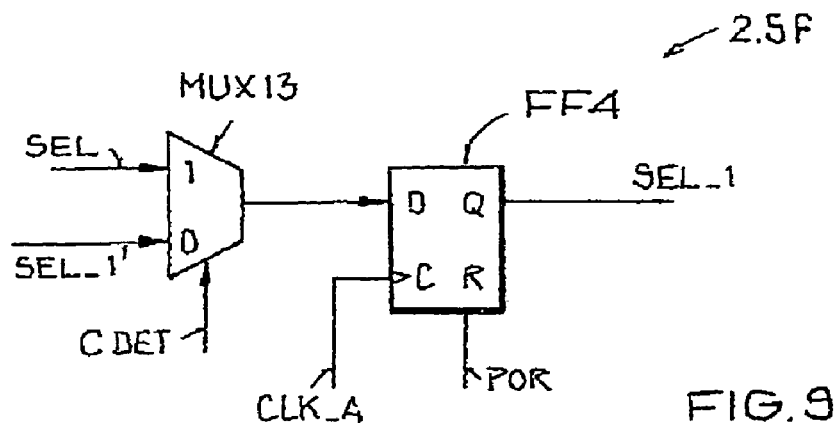
FIG. 9 illustrates in detail a circuit arrangement for generating a first select signal.

FIG. 9 shows in detail a circuit arrangement for generating a first select signal. The circuit arrangement according to FIG. 9 corresponds to select signal control unit 2.5f in FIG. 3. It has a 2-to-1-multiplexer MUX13 and a flip-flop FF4. The select signal SEL_1 is applied at input E0 of multiplexer MUX13, whereas the select signal control/switch signal SEL is applied at input E1 of multiplexer MUX13. The address signal for multiplexer MUX13 is formed by the control signal CDET (FIGS. 3 and 4b). The output of multiplexer MUX13 is connected to the data input D of flip-flop FF4, at whose clock input C the clock signal CLK_A is applied. The reset signal POR is applied at the reset input R of flip-flop FF4. Flip-flop FF4 outputs the select signal SEL_1 at its output Q.

Figure 10:
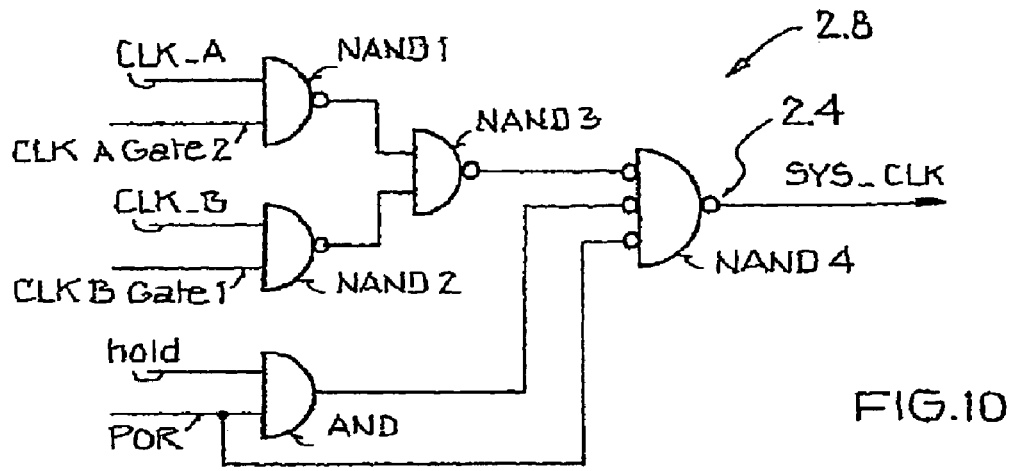
FIG. 10 illustrates in detail a logic circuit arrangement of a clock gate according to FIG. 2.

FIG. 10 shows in detail a logic circuit arrangement of clock gate 2.8 according to FIG. 2. It is formed from a number of NAND gates NAND1-NAND4 and an AND gate AND. The first clock signal CLK_A and the gate signal ClkAGate2 generated by the second control module 2.6 are applied at both terminals of the NAND gate NAND1 (FIG. 2). Accordingly, the second NAND gate NAND2 links the second clock signal CLK_B and the gate signal ClkBGate1 generated by first control module 2.5 (FIG. 2). The outputs of the NAND gates NAND1, NAND2 are linked to the inputs of the NAND gate NAND3. The global clock hold signal hold and the inverted reset signal POR are applied at the inputs of the AND gate AND. The fourth NAND gate NAND4 has three inverted inputs, at which the output signal of the NAND gate NAND3, the output signal of the AND gate AND, and the reset signal POR are applied. The NAND gate NAND4 supplies at its output the system clock signal SYS_CLK, whereby the output of the NAND gate NAND4 at the same time forms the output 2.4 (FIG. 2) of clock synchronization unit 2 of the invention.

Figure 11:
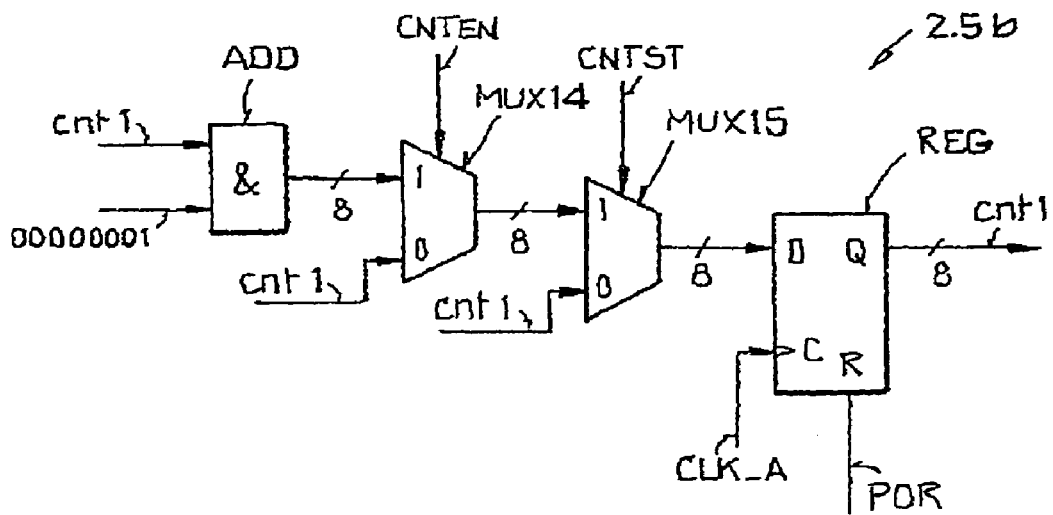
FIG. 11 illustrates in detail a circuit arrangement for generating a counter signal.

FIG. 11 shows in detail a circuit arrangement for generating a counter signal. The circuit arrangement according to FIG. 11 corresponds to counter 2.5b according to FIG. 3. It is formed from an adder ADD, two 2-to-1-multiplexers (change-over switches) MUX14, MUX15, and an 8-bit register REG. Input E1 of multiplexer MUX14 is connected to the adder ADD. Said adder is designed to add signals cnt1 and "00000001," which are applied at the respective inputs of the adder ADD. In so doing, the signal cnt1 represents a current counter value of counter 2.5b, whereas the signal "0000001" represents the counter increment (increment unit of 1 bit). The counter signal cnt1 is also applied at input E0 of multiplexer MUX14. The address signal for multiplexer MUX14 is formed by the control signal CNTEN (compare FIGS. 3 and 5). The output of multiplexer MUX14 is connected to input E1 of multiplexer MUX15, at whose input E0 the counter signal cnt1 is applied. The address signal for multiplexer MUX15 is formed by the control signal CNTST (compare FIGS. 3 and 4d). The output of multiplexer MUX15 is connected via an 8-bit line to the corresponding data inputs of the register REG, at whose clock input C the clock signal CLK_A is applied. The reset signal POR is applied at the reset input R of the register REG. The register REG outputs the counter signal cnt1 again via an 8-bit line.

According to FIG. 2, process multiplexer 2.7 of clock synchronization unit 2 of the invention outputs the (global) clock hold signal hold. A corresponding circuit arrangement is shown in FIG. 12.

Figure 12:
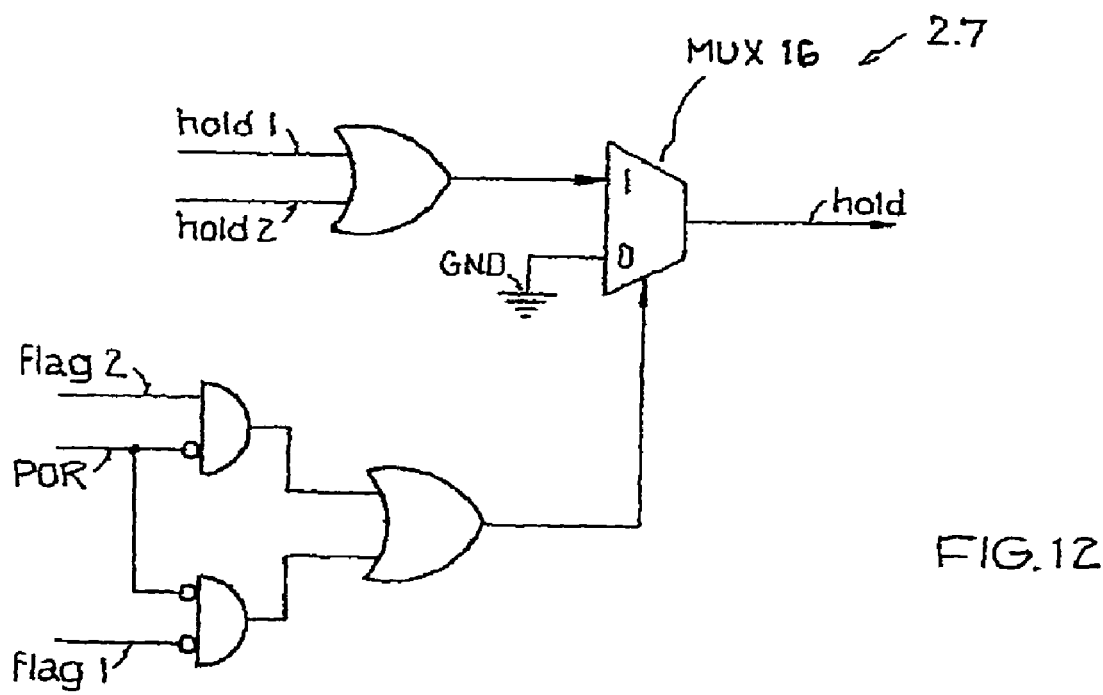
FIG. 12 illustrates in detail a circuit arrangement for generating a global clock hold signal.

FIG. 12 shows in detail a circuit arrangement for generating a global clock hold signal. The circuit arrangement according to FIG. 12 corresponds to processor multiplexer 2.7 according to FIG. 2. It is formed from a number of AND/OR operations and a "2-to-1" multiplexer (change-over switch) MUX16. The signal at input E1 of multiplexer MUX16 is formed by ORing of the first and second clock hold signals hold1 and hold2. The input E0 of multiplexer MUX16 is at ground potential GND. The control signal for multiplexer MUX16 is formed by logic operations of the first and second clock switching block signals flag1 and flag2 and the reset signal POR. For this purpose, the first clock switching block signal flag1 and the reset signal POR, as well as the second clock switching block signal flag2 and the reset signal POR, are each inverted and ANDed pairwise, as shown in FIG. 12. This means that both an ANDing of the inverted first clock switching block signal flag1 and the inverted reset signal POR and an ANDing of the inverted second clock switching block signal flag2 and the inverted reset signal POR occur. The results of these two AND operations are again linked in the form of an OR logic operation, whereby the result of this OR operation forms the address signal for multiplexer MUX16. This outputs the global clock hold signal hold via its output.

The circuit arrangements, corresponding to the circuit arrangements in FIGS. 4a through 12 in each case, for the (substantially identical) second control module 2.6 come about in a manner obvious to the person skilled in the art by a simple exchange or replacement of the indicated (control) signals by the corresponding signals of the second control module, as is evident, for example, from FIG. 2. A detailed description of the circuit arrangements in the second control module 2.6 can therefore be omitted in the present case. It is only noted here that in the first control module 2.5 the control signal ClkBGate1 for POR=1 is reset, whereas in the second control module 2.6 the control signal ClkAGate2 for POR=1 is set.

The operation of clock synchronization unit 2 of the invention according to FIGS. 2 through 12 will now be described in greater detail with use of the timing diagram in FIG. 13 a,b:

FIG. 13 a,b both show a timing diagram to depict the signal flow in a clock synchronization unit 2 of the invention (FIGS. 2-12). According to the invention, the two structurally identical control modules 2.5, 2.6 of clock synchronization unit 2 of the invention during operation have a master-slave dependence, whereby the control module, whose clock signal CLK_A, CLK_B is provided at a given observation time, for example, as a default setting after a reset (POR), as the system clock signal SYS_CLK at output 2.4 of clock synchronization unit 2, functions as the master.

All signals or signal curves shown in FIG. 13 a,b are digital signals, which in each case can be switched between a logic LOW level ("0") and a logic HIGH level ("1"), so that it is possible to realize the entire circuit arrangement 1 (FIG. 1) as a completely digital circuit arrangement, which has an especially very advantageous effect on synthesis capability by means of conventional synthesis tools.

The case is described hereafter in which first, by default after a completed reset POR, the first clock signal CLK_A functions as the system clock, so that first control module 2.5 is initially the master and second control module 2.6 initially the slave. In such a constellation, the switch signal or select control signal SEL, particularly at the transition from logic LOW, i.e., a low logic level, for example, at the level of the ground potential GND, to logic HIGH, i.e., a high logic level, for example, at the level of the supply voltage VDD (transition "01"), can trigger a switching process for switching the system clock from the first clock signal CLK_A to the second clock signal CLK_B. This is shown in FIG. 3 accordingly in the diagram line labeled with SEL.

Figure 13A:
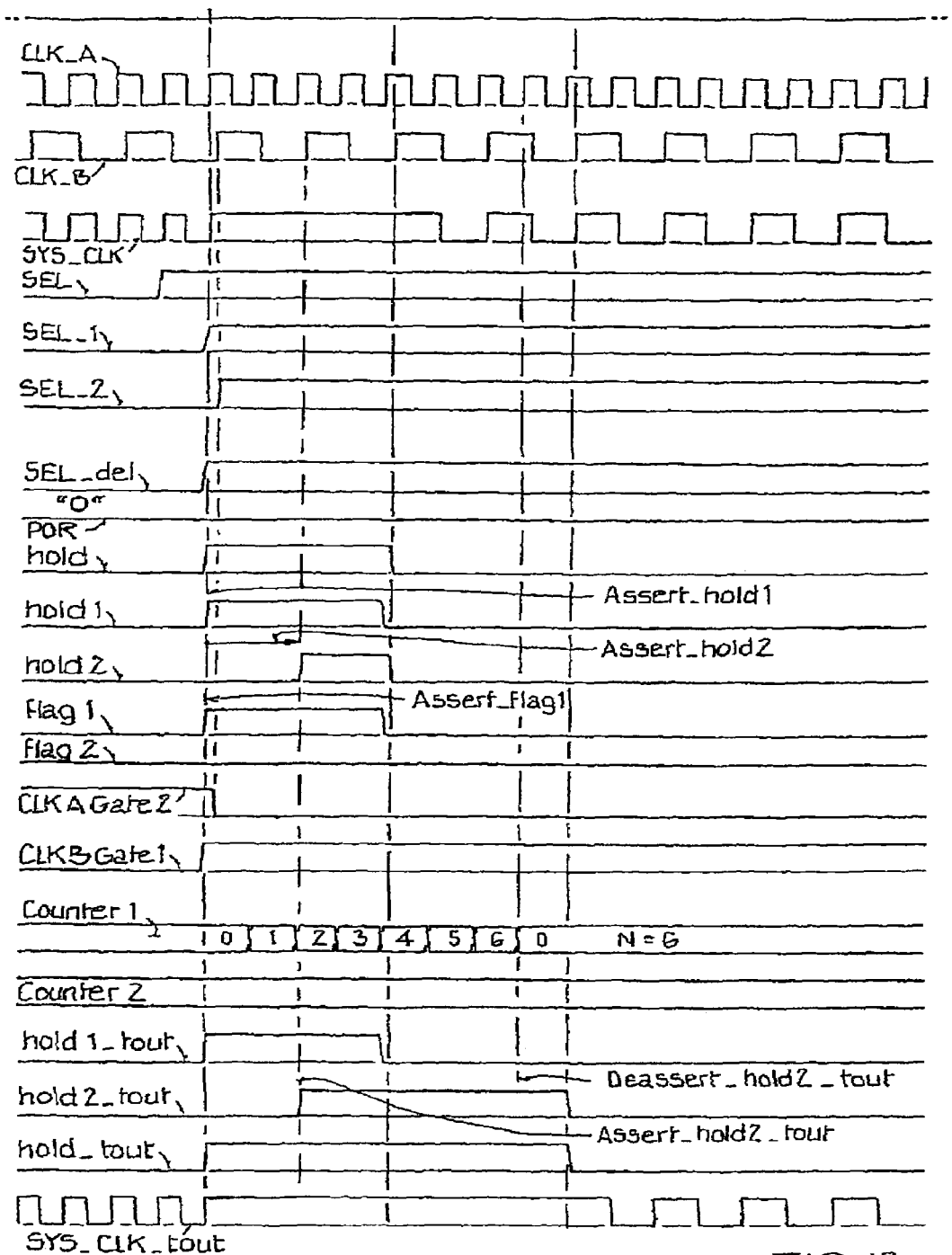
FIG. 13 a,b illustrate a timing diagram to illustrate an operation of the clock synchronization unit of the invention or to depict a method of the invention for switching a system clock.

As is likewise evident from FIG. 13a, before this triggering time, first, the first clock signal CLK_A is outputted in a standard manner as system clock signal SYS_CLK after an initial reset, whereby with the applied reset signal (POR=HIGH) a constant HIGH level signal is outputted at output 2.4 (FIG. 2). Accordingly, the OR gate 2.8 (FIG. 2) always outputs a (time-resolved) HIGH level signal via output 2.4 whenever a respective (HIGH level) signal is applied at at least one of its inputs, which is familiar to the person skilled in the art.

According to FIG. 9 (in conjunction with FIG. 4b), process multiplexer 2.7 (FIG. 2) from the actual switch signal SEL generates a switch signal SEL_del, delayed according to the clock CLK_A, said signal which is definitive according to FIG. 13 for further clock switching. In the following text, however, for reasons of clarity, the signals SEL and SEL_del will not be differentiated.

After switching of the system clock from the first clock signal CLK_A to the second clock signal CLK_B was triggered or initiated by the switch signal or select control signal SEL by the already described transition "01," block signal control unit 2.5*d* (FIG. 7) of master control module 2.5 generates the block signal flag1, i.e., switches it from a standard logic LOW level to a logic HIGH level, as is evident from the correspondingly labeled diagram line in FIG. 2 ("Assert_flag1"). At the same time, hold signal control unit 2.5*c* of master control module 2.5 in accordance with the additional (control) signals, indicated in FIG. 6, generates the clock hold signal hold1, i.e., switches it from a logic LOW level to a logic HIGH level, as can also be seen from the correspondingly labeled diagram line in FIG. 13*a* ("Assert_hold1"). In so doing, the switching in the present case always occurs at a rising edge (r.e.) of the first clock signal CLK_A.

Shortly after the previously described processes, optionally counter 2.5*b* of master control module 2.5 is started, which counts, in accordance with the first clock signal CLK_A definitive for the first control module 2.5, up to a predefined end value N or end value N predefinable by software by a user or an appropriate time value TVAL1 (FIG. 2), whereby this end value N (here N=6) is selected such that the time $T_c$ assigned to it (measured in periods of the first clock signal CLK_A) applies:

$$T_c = 2 \cdot T_p + T_s,$$

where $T_p$ designates a cycle duration of the first clock signal CLK_A and $T_s$ a cycle duration of the second clock signal CLK_B (primary or secondary clock signal). It follows from this further that:

$$N = 2 + |T_s/T_p| - 1$$

for the minimal value for TVAL1 (FIG. 2), whereby the summand "−1" indicates that a clock cycle of CLK_A is necessary to count to "1."

Then, for differentiation, signals generated with use of counter 2.5*b* (clock hold signals, system clock signal) are designated with the extension "_tout."

Furthermore, in each case a gate control signal ClkBGate1 is set to logic HIGH by gate control unit 2.5*e* of master control module 2.5 (compare FIG. 8).

Because second control module 2.6 (FIG. 2) functions as a slave module, the respective signals hold2, flag2 generated there remain first at logic LOW, and counter 2.6*b* is not started in any case. Furthermore, the gate control signal ClkAGate2 is outputted by gate control unit 2.6*e* of slave control module 2.6 to a logic LOW level.

The previously described clock switching block signals flag1, flag2 and clock hold signals hold1, hold2 or hold1_tout, hold2_tout are relayed to process multiplexer 2.7 (FIG. 12), which performs the defined logic operations of the indicated input signals and particularly which outputs the global hold signal hold, also shown in FIGS. 2 and 12.

In so doing, the global clock hold signal hold (hold_tout) is formed particularly from the first clock hold signal hold1 (hold1_tout) and the second clock hold signal hold2 (hold2_tout) in terms of an OR operation (OR). In other words: The global clock hold signal hold has a logic HIGH level, when at least one of the first and second clock hold signals hold1, hold2 has a logic HIGH level, which applies accordingly to the signals "_tout." This is also shown in FIG. 13*a* in the correspondingly labeled diagram lines.

According to the invention, as already mentioned, first the clock hold signal hold1 or hold1_tout, in accordance with master control module 2.5, is set to logic HIGH, as soon as master control module 2.5 detects the application of a respective switch signal or select control signal SEL. At the same time, according to the invention, the global clock hold signal hold or hold_tout is also set to logic HIGH. As likewise already mentioned, the thus generated first clock hold signal hold1 (hold1_tout) is applied at hold signal control unit 2.6*a* of slave control module 2.6 (compare FIG. 2). According to the invention, then, with a certain time delay relative to the first clock hold signal hold1, with the next rising edge of the second clock signal CLK_B, also the second clock hold signal hold2 (hold2_tout) is set by hold signal control unit 2.6*a* to logic HIGH, which is labeled in FIG. 13*a* in addition with "Assert_hold2" or "Assert_hold2_tout." In other words: The held state of the first clock signal CLK_A, which is expressed in a logic HIGH level of the first clock hold signal hold1 (hold1_tout), is relayed by master control module 2.5 to slave control module 2.6, which is expressed in the adjusted logic HIGH level of the second clock hold signal hold2 (hold2_tout).

As likewise already described with use of FIG. 2, the second clock hold signal hold2, generated by hold signal control unit 2.6*a* of slave control module 2.6, is applied at hold signal control unit 2.5*c* of master control module 2.5. If it or its hold signal control unit 2.5*c* detects the setting of the second clock hold signal hold2 to logic HIGH, as previously described, then according to FIG. 13*a* in conjunction with FIG. 6 the first clock hold signal hold1 is reset to logic LOW. In this way, the first and second control modules 2.5 of the invention perform a handshake operation, to inform themselves mutually of the triggered system clock switching.

As can also be derived from FIG. 13*a*, during the entire time for which the first clock hold signal hold1 and/or the second clock hold signal hold2 are at logic HIGH, the global clock hold signal hold also remains at logic HIGH and is outputted in this form by process multiplexer 2.7 (FIG. 2), provided the reset signal POR and at least one of the clock switching block signals flag1, flag2 have a low logic level (LOW) (compare FIG. 12). It is noted, however, that resetting (reset, POR=1) of the clock synchronization unit of the invention always results in stopping or holding of the system clock, i.e., POR=1→SYS_CLK=1. While the global clock hold signal hold (hold_tout) is at logic HIGH, the system clock signal SYS_CLK (SYS_CLK tout) according to FIG. 13*a* is also held constant at a logic HIGH level. This results from the already mentioned OR logic functionality (OR) of switching element 2.8 (FIG. 2).

With the resetting of the second clock hold signal hold2 to a logic LOW level in accordance with a next rising edge of the second clock signal CLK_B, according to the invention, because of the already performed resetting of the first clock hold signal hold1 to logic LOW, a corresponding resetting of the global clock hold signal hold also occurs, as depicted in FIG. 13*a* (compare FIG. 12). In accordance with process multiplexer 2.7 (FIG. 12), this resetting of the global clock hold signal hold, however, occurs only when previously the block signal flag1, set initially to logic HIGH by block signal control unit 2.5*d* of master control module 2.5 in the cycle of the first clock signal CLK_A, was again reset to a logic LOW level.

This occurs optionally with use of counter 2.5*b* of master control module 2.5, when it has reached its predefined end value N (cnt1=TVAL1) and accordingly fires (compare FIG. 7 in conjunction with FIG. 11 in regard to the clock hold signal hold2_tout). First, a resetting of the clock switching block signal flag1 to logic LOW by block signal control unit 2.5d according to FIG. 7 is again brought about. This resetting of the clock switching block signal flag1 occurs at a rising edge of the first clock signal CLK_A, said edge following the setting of the clock hold signal hold2_tout. Thus, according to FIG. 13a, slave control module 2.6 or its hold signal control unit 2.6c can then, i.e., with another (next) rising edge of the second clock signal CLK_B after completed querying of the flag1 input, reset the second clock hold signal hold2_tout to logic LOW, when counter 2.5b has already reached its end value N or TVAL1 (so-called "rollover" of the counter). This is designated in FIG. 13a by "Deassert_hold2_tout" and, as already mentioned, promptly causes a corresponding resetting of the global clock hold signal hold_tout by process multiplexer 2.7 (FIG. 12).

Accordingly, the second clock signal CLK_B can then be outputted as a new system clock signal SYS_CLK at output 2.4 of circuit arrangement 2 (FIG. 2). For the purpose of a corresponding output control, to that end, the first and second clock signals CLK_A, CLK_B before the application at OR gate 2.8 (FIG. 2) are linked in each case via an AND operation ("&") with the gate control signal ClkBGate1 or ClkAGate2 output by control modules 2.5, 2.6, which is not shown explicitly in FIG. 2, however. In other words: The gate control signals ClkBGate1, ClkAGate2 form a type of mask with whose help switching element 2.8 selects the system clock signal SYS_CLK to be outputted.

As can also not be derived explicitly from FIG. 13a, the application of a reset signal (POR=HIGH) provides for the output of a constant ("frozen") system clock signal at a logic HIGH level. A corresponding timing phase or a corresponding state can be designated in FIG. 13 a,b analogous to the previously described switching phases "reset." The (not shown) reset state is followed by a so-called "idle" state, in which (still) no clock switching occurs, so that by default the first clock signal CLK_A is outputted as the system clock signal SYS_CLK.

After this, as described in detail, the switching process from the first clock signal CLK_A to the second clock signal CLK_B is triggered by the level change of the switch signal or select control signal SEL from logic LOW ("0") to logic HIGH ("1").

After completed switching of the system clock signal from the first clock signal to the second clock signal, the functionalities of the first and second control modules 2.5, 2.6 (FIG. 2) are now exchanged. In other words: After completed switching of the system clock signal from the first clock signal to the second clock signal, now second control module 2.6 has the master function, described in greater detail above, whereas first control module 2.5 whose (first) clock signal CLK_A is not outputted at the time as the system clock signal SYS_CLK, now has the slave function.

Figure 13B:
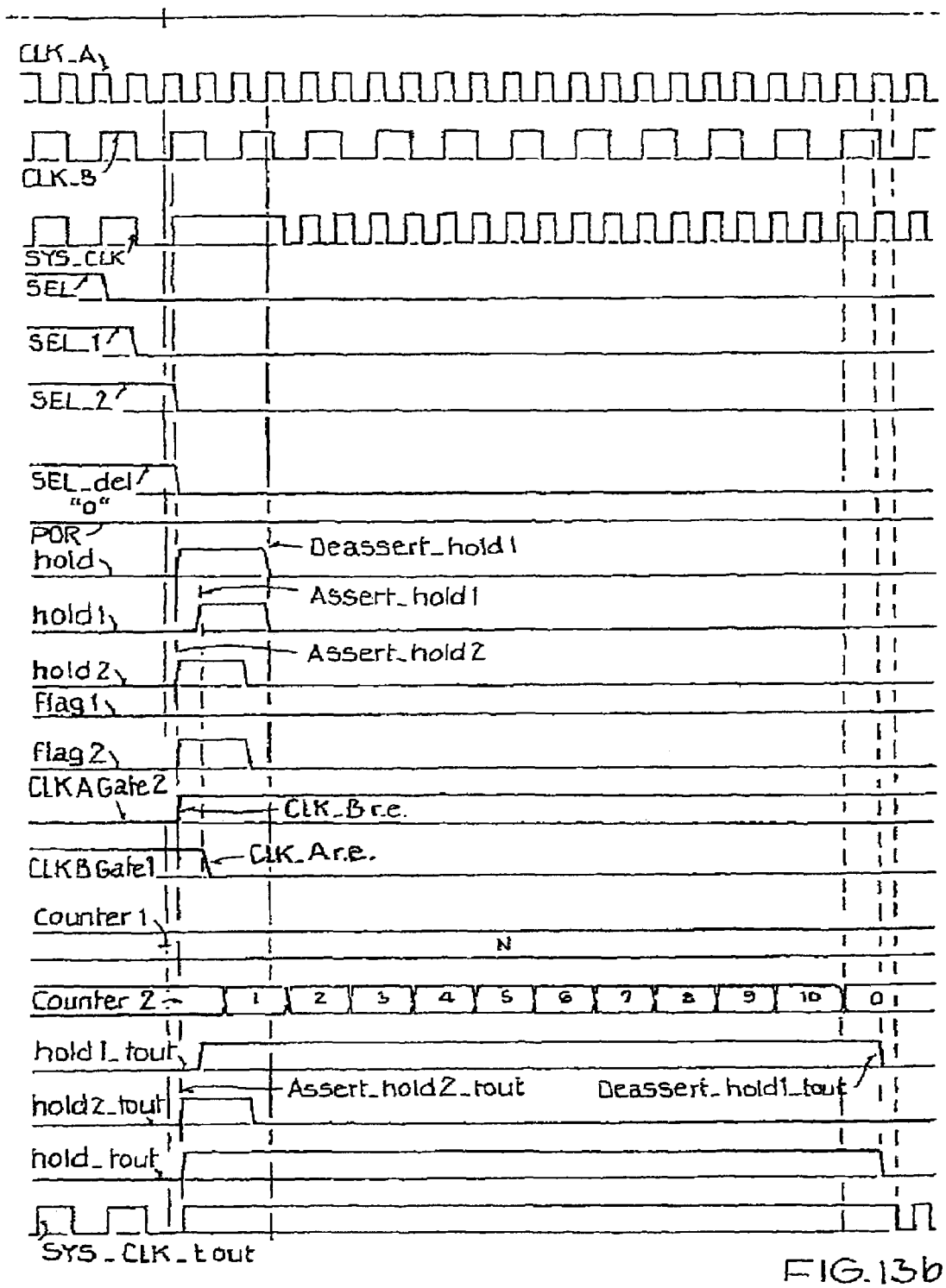

Accordingly, in FIG. 13b analogously another switching process from the second clock signal CLK_B is shown reset to the first clock signal CLK_A, in which thus second control module 2.6 functions as the master control module, whereas first control module 2.5 assumes the role of the slave module. The switching process itself proceeds as described in detail above for the state "CLK_B," whereby, however, instead of the definitive elements of first control module 2.5, the corresponding elements of second control module 2.6 are used and vice versa. Because of the mirror image nature of the process, therefore, in the present case a detailed description of the switching back to the clock signal CLK_A can be omitted. It is triggered according to the invention by a switching of the select control signal SEL from logic HIGH to logic LOW ("10"), as can be derived from FIG. 13b at t=4.2 μs.

The use of counter 2.5b, 2.6b, as was previously emphasized, is an optional feature of the presently described embodiment of the invention, which, for example, is triggered by the receipt of another control signal, provided herefor, by the clock synchronization unit of the invention (not explicitly shown). According to the invention, the system clock switching is forced close to a predefined time point, namely, the timing out of the pertinent counter by the resetting of the corresponding clock switching block signal flag1 or flag2 to logic LOW after the timing out of the particular counter 2.5b, 2.6b. Alternatively to such an embodiment, it is also possible, however, to allow the system clock switching of a counter immediately after the handshake operation, described further in greater detail above, which optionally can lead to a more rapid clock switching.

The operation of clock synchronization unit 2 of the invention (FIG. 2) for the transition from the first clock signal CLK_A to the second clock signal CLK_B as the system clock signal SYS_CLK is again described summarized below:

a) The switch signal SEL is applied externally to request a system clock switching. A transition of the switch signal SEL from "0" to "1" is used to request a switching of the system clock from CLK_A to CLK_B.

b) The state of the SEL input signal is sampled in control module 2.5 by means of the first clock signal CLK_A to generate the signal SEL_1 (compare FIG. 9). The signal SEL is sampled also in second control module 2.6 by means of the second clock signal CLK_B to generate the signal SEL_2 (analogous to FIG. 9).

c) A change in the SEL signal (SEL=1) is sampled at a rising edge of the first clock signal CLK_A, as a result of which the signals hold1 and flag1 are each set to a high logic level (hold1=1, flag1=1). This leads, in addition, to setting the signals hold and ClkBGate1 to a high logic level and the signal ClkAGate2 to a low logic level.

d) A transition of the signal hold1 from "0" to "1" causes a setting of the signal hold2 to a high logic level (hold2=1) at a next rising edge of the second clock signal CLK_B.

e) As soon as the signal hold2 is set, the signal hold1 is reset at the next rising edge of the first clock signal CLK_A.

f) The signal flag1 is reset at the next rising edge of the first clock signal CLK_A.

g) With the reset signal flag1, the signal hold2 is reset at the next rising edge of the second clock signal CLK_B, which causes a simultaneous resetting of the global hold signal hold.

h) As soon as the signal hold was reset, the system clock signal SYS_CLK is activated on the basis of the second clock signal CLK_B at the next falling edge of the received second clock signal CLK_B.

The switching of the system clock according to the invention from the second clock signal CLK_B back to the first clock signal CLK_A is again described summarized below:

a') The switch signal SEL is applied externally to request a system clock switching. A transition of the switch signal SEL from "1" to "0" is used to request a switching of the system clock from CLK_B to CLK_A.

b') The state of the SEL signal is sampled by means of the clock signal CLK_B to generate and output the signal SEL_2. The SEL signal is sampled in addition by means of the clock signal CLK_A to generate and output the signal SEL_1.

c') A change in the SEL signal (SEL=0) is sampled at a rising edge of the clock signal CLK_B, which causes a setting of the clock hold signal hold2 (hold2=1) and of the clock switching block signal flag2 (flag2=1). At the same time, the signal hold and the signal ClkAGate2 are also set to a high logic level and the signal ClkBGate1 to a low logic level.

d') A transition of the signal hold2 from "0" to "1" causes a setting of the signal hold1 (hold1=1) at the next rising edge of the second clock signal CLK_A.

e') As soon as the signal hold1 is set, the signal hold2 is reset at the next rising edge of the clock signal CLK_B.

f') The signal flag2 is reset at the next rising edge of the clock signal CLK_B.

g') With the reset signal flag2, the signal hold1 is reset at the next rising edge of the dock signal CLK_A, which causes a simultaneous resetting of the global hold signal hold.

h') As soon as the signal hold was reset, the system clock signal SYS_CLK is activated on the basis of the clock signal CLK_A at the next falling edge of the received clock signal CLK_A.

As emerges from the above description of the operation of the clock synchronization unit of the invention, each control module generates gate signals, which enable a switching of the clock, on the basis of its specific input clock, i.e., CLK_A or CLK_B. Here, control module 2.5 generates exclusively the gate signal ClkBGate1, and control module 2.6 generates exclusively the gate signal ClkAGate2.

Upon a reset of the system (POR=1), the standard system clock output is determined by the settings of the gate signals. At present, the SYS_CLK=1 and ClkBGate1=0 and ClkAGate2=1 apply as standard; i.e., SYS_CLK is kept/"frozen" at a high logic level.

Accordingly, in the context of the present invention, the following conditions are usually maintained in the system clock switching:

The gate signal corresponding to the new system clock must always be released first, i.e., set to a high logic level, before the gate signal corresponding to the current system clock is turned off, i.e., is set to a low logic level. For example, before the transition from CLK_A to CLK_B, from a ground state with ClkBGate1=0 and ClkAGate2=1, first ClkBGate1 is set, before ClkAGate2 is reset, so that both gate signals are set for a short time period during switching of the system clock.

Furthermore, the gate signals are always set and reset by the specific control module. For example, the signal ClkBGate1 is always controlled by first control module 2.5, and the gate signal ClkAGate2 is always controlled by second control module 2.6. Gate signals are set whenever the corresponding control module of the SEL signal is detected. Furthermore, gate signals are reset whenever the hold signal is detected.

According to the above description, the output signals, generated by the coupled pair of control modules, are decoded by process multiplexer 2.7, which can also be called accordingly a state decoder. The input signals for process multiplexer 2.7 were already described with use of FIG. 2. The table in FIG. 14 shows an overview of possible states of the output signal hold of process multiplexer 2.7 as a function of the input signals POR, flag1, flag2, SEL_1, and SEL_2.

FIG. 14 shows a tabular overview of possible states of an output signal of a state decoder in a clock synchronization unit of the invention as a function of possible input values. In FIG. 14, a high logic level is designated with "1" and a low logic level with "0." The reference character "X" indicates any logic level, i.e., optionally "0" or "1." "OR" stands for an OR operation. Four states 1 through 4 are shown in FIG. 14 and each are characterized by a certain combination of input signals, i.e., corresponding logic signal levels. State 1 is a reset state during which the unit is reset. The clock signal CLK_A is set as the standard system clock. It is assumed that SEL=0 applies. In state 2 (run state), the unit is in a normal operating state; i.e., a request for switching to the system clock is no longer valid or was completely executed. State 3 is an A-to-B transitional state. The unit has entered a switching state from clock signal CLK_A to clock signal CLK_B, whereby SEL=1 applies. In contrast, state 4 designates a B-to-A transitional state. Here, the unit has entered a switching state from CLK_B to CLK_A, whereby SEL=0 applies.

The clock gate or OR gate 2.8 (FIG. 2) functions as a final switching device to output the system clock. As already described heretofore, the functions of this module comprise: holding of the clock output (SYS_CLK=1), when the request for a clock switching was received; i.e., the SEL signal had changed its state (hold=1); holding the clock output (SYS_CLK=1), when POR has a high logic level (POR=1; reset-state); application of the clock signal CLK_A at the system clock output 2.4 (FIGS. 1 and 2); i.e., SYS_CLK=CLK_A, when ClkAGate2 is set and ClkBGate1 is reset (ClkAGate2=1, ClkBGate1=0); application of CLK_B at the system clock output (SYS_CLK=CLK_B), when ClkAGate2 is reset and ClkBGate1 is set (ClkAGate2=0, ClkBGate1=1).

This is shown again in summary form in FIG. 15.

FIG. 15 shows in tabular form the output of the clock gate (OR gate 2.8; FIG. 2) as a function of the applied input signals. In FIG. 15, the entry "0" designates a low logic level, the entry "1" designates a high logic level, and the entry "X" designates any logic level. The value of the output signal SYS_CLK is shown as a function of values of the input signals CLK_A, CLK_B, POR, hold, ClkAGate2, and ClkBGate1.

Figure 16:
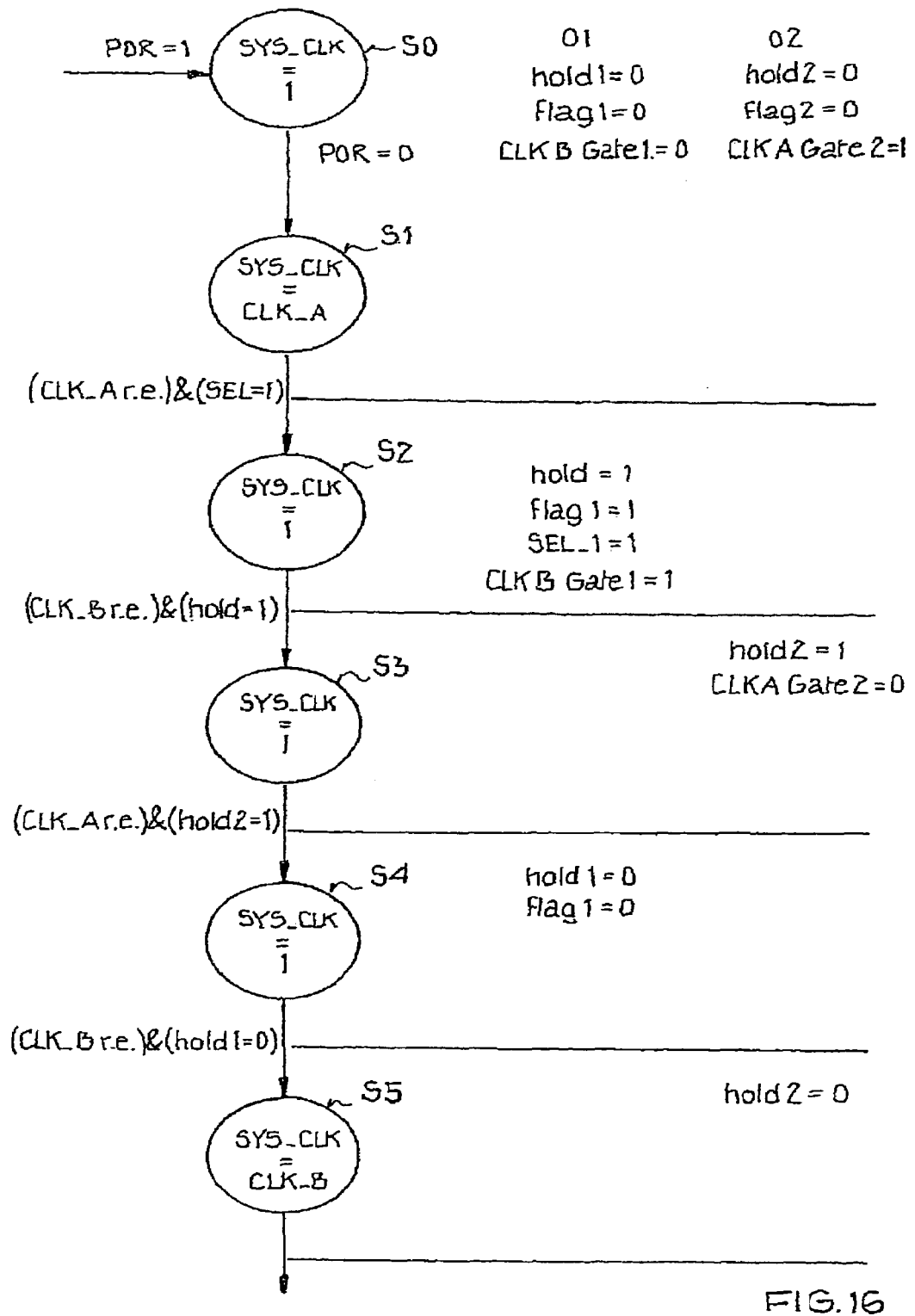
FIG. 16 illustrates a state diagram to show the course of an embodiment of the method of the invention during switching of the system clock from the first to a second clock signal.

FIG. 16 is a state diagram for depicting the course of an embodiment of the method of the invention during switching of the system clock from a first to a second clock signal. In FIG. 16, different states S1-S5 of the clock synchronization unit 2 of the invention (FIG. 2) are shown on the left in a time sequence, which is symbolized by (vertical) arrows. Corresponding outputs O1 or O2 of first control module 2.5 or second control module 2.6 are shown for each of the states S1-S5 on the right above a horizontal line in FIG. 16; i.e., the logic levels of definitive output signals of the particular control module are listed. The designation "r.e." in FIG. 16, as in the following FIG. 17, stands for a rising edge of the particular clock signal CLK_A, CLK_B, whereby, however, in principle alternatively the clock signals can also be triggered by a falling edge. The symbol "&" stands for an AND operation. The particulars presented in FIG. 16 on the left at the level of a particular horizontal line represent conditions which must be satisfied, so that the clock synchronization unit of the invention switches from a state Si to the next state Sj.

The unit of the invention enters the reset state S0 by (repeated) application of a reset signal POR=1, as already extensively described above.

When POR=0, the clock synchronization unit switches to the state S1, and SYS_CLK switches from "1" (high logic level) to CLK_A. In state S1, the output O1 is formed from hold1=0, flag1=0, and ClkBGate1=0. The output O2 is formed from hold2=0, flag2=0, and ClkAGate2=1.

When SEL=1 applies at the same time at a rising edge of the first clock signal CLK_A, the unit switches to state S2. In this state, the output O1 includes hold1=1, SEL_1=1, flag1=1, and ClkBGate1=1.

A rising edge of the second clock signal CLK_B, with simultaneous fulfilling of the condition hold1=1, switches to state S3. In this state, the output O2 comprises particularly hold2=1 and ClkAGate2=0.

Another rising edge of the first clock signal CLK_A, with simultaneous fulfilling of the condition hold2=1, leads to state S4, in which the output O1 is characterized by hold1=0 and flag1=0. Then, the unit at another rising edge of the second clock signal CLK_B and simultaneous fulfilling of the condition hold1=0 switches to state S5, which is characterized by the output O2 with hold2=0 and in which SYS_CLK=CLK_B applies.

Figure 17:
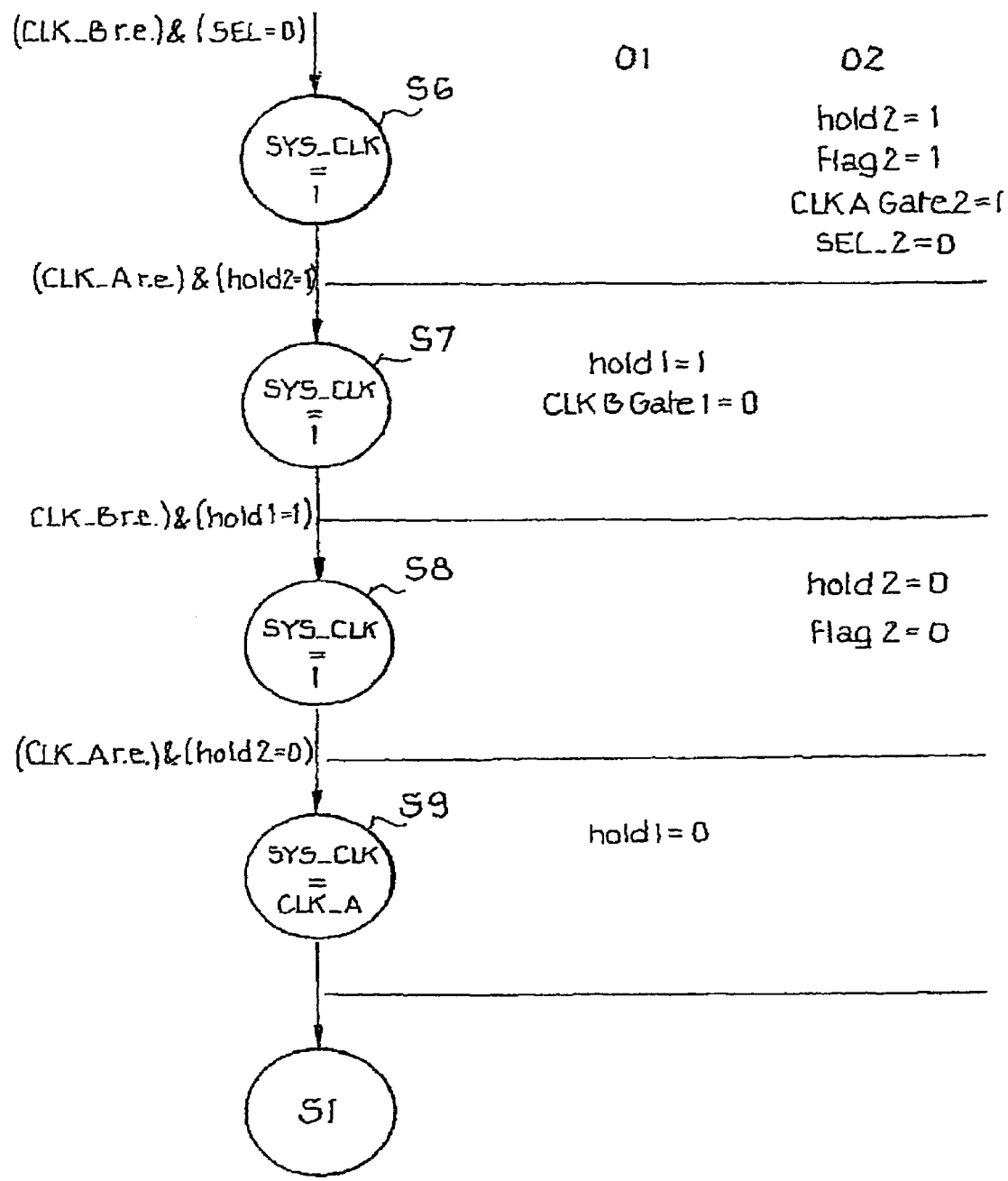
FIG. 17 illustrates a state diagram corresponding to FIG. 16 for switching the system clock from the second clock signal back to the first clock signal.

FIG. 17 shows a state diagram, corresponding to FIG. 16, with states S6-S9 for switching of the system clock from the (second) clock signal CLK_B back to the (first) clock signal CLK_A. At a rising edge of the second clock signal CLK_B and simultaneous fulfilling of the condition SEL=0, the unit reaches state S6, in which O2 includes hold2=1, flag2=1, ClkAGate2=1, and SEL_2=0. A rising edge of the first clock signal CLK_A, with simultaneous fulfilling of the condition hold2=1, triggers state S7, in which the output O1 is characterized by hold1=1 and ClkBGate1=0. With another rising edge of the second clock signal CLK_B, with simultaneous fulfilling of the condition hold1=1, the system reaches state S8, in which the output O2 is characterized by hold2=0 and flag2=0. Finally, another rising edge of the first clock signal CLK_A with simultaneous fulfilling of the condition hold2=0 brings the system into state S9, in which hold1=0 applies to the output O1. In state S9, the system clock SYS_CLK is again switched to the first clock signal CLK_A. This state in terms of signaling corresponds to the state S1 (compare FIG. 16).

The clock switching process of the invention or the clock synchronization unit of the invention has a number of advantages over prior-art methods or devices for asynchronous clock switching: In one respect, the unit of the invention enables a completely digital implementation, so that it can be synthesized without changes in standard logic libraries in hardware. In addition, no costly custom production of circuit elements are necessary during the implementation of the present invention.

During operation of the unit of the invention or during execution of the method of the invention, the system clock cycle and/or frequency remain unchanged with exception of a short transition time in which the system clock is switched. Because the clock switching always occurs at a clock edge (edge), no change in the duty cycle results with the exception of the transitional phase, which, as was stated heretofore, is always longer than $2 \cdot T_p + T_s$. In addition, the proposed optional safety logic avoids switching to a defective clock source or a clock source whose clock cycles are longer than expected, in that a switching request is held back and the original clock is maintained.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for switching a system clock from a first clock signal to a second clock signal, the switching process is triggered by a select control signal and the switching occurs synchronously to the first and/or second clock signal, the method comprising:
    transferring the clock control from a first predefined edge of the first clock signal to a corresponding first edge of the second clock signal;
    holding, in accordance with the first clock signal, a system clock signal at a first predefined logic signal level which is the same level as a system clock hold signal, wherein a corresponding first edge of the second clock signal is awaited; and
    resetting, in accordance with a received first edge of the second clock signal, the system clock hold signal to a second logic state and reactivating, via a second edge of the second clock signal, the system clock signal whereby the second clock functions as the system clock.

2. The method according to claim 1, wherein, in accordance with the select control signal, a first clock hold signal is generated synchronously to the first clock signal by a first control module for the first clock signal, wherein the first clock hold signal is relayed to a second control module for the second clock signal, wherein a second clock hold signal is generated by the second control module synchronously to the second clock signal, wherein the system clock hold signal is generated from the first and second clock signals, wherein the second clock hold signal is relayed to the first control module, and wherein a state of the first clock hold signal is changed depending on the relayed second clock hold signal.

3. The method according to claim 1, wherein a time since the application of the select control signal is determined and wherein the switching of the system clock signal is released when a predefined time threshold is reached.

4. The method according to claim 3, wherein the time threshold is at least $2 \cdot T_p + T_s$, where $T_p$ designates a cycle duration of the first clock signal and $T_s$ a cycle duration of the second clock signal.

5. The method according to claim 1, wherein the first and second clock signals are each selected from a plurality of clock signals.

6. A clock synchronization unit for an electronic system, particularly for a microprocessor, the clock synchronization unit comprising:
    a first input for a first clock signal;
    a second input for a second clock signal;
    a third input for a select control signal;
    an output for a system clock signal;
    a first control module controlled by the first clock signal; and
    a second control module controlled by the second clock signal and being operatively connected to the first control module,
    wherein the first control module, upon application of a predefined signal level of the select control signal at a third input synchronously with the first clock signal, is designed to set the system clock signal from the first clock signal to a predefined logic signal level as a system clock hold signal, and
    wherein the second control module is designed, synchronously with the second clock signal, to reset the system clock hold signal and to cause an output of the second clock signal as the system clock signal.

7. The clock synchronization unit according to claim 6, wherein the first control module is designed in accordance with the select control signal to generate a first clock hold signal and to relay the same to the second control module, wherein the second control module is designed upon receipt of the first clock hold signal to generate a second clock hold signal and to relay the same to the first control module, wherein the first control module is designed to reset the first clock hold signal upon receipt of the second clock hold signal, and wherein the second control module is designed to reset the second clock hold signal.

8. The clock synchronization unit according to claim 7, further comprising a switching element, which is designed to generate the system clock hold signal from at least the first and second clock hold signals.

9. The clock synchronization unit according to claim 6, wherein at least the first control module has a counter, which is designed to determine a time depending on the select control signal.

10. The clock synchronization unit according to claim 6, wherein at least the first control module is designed to generate a clock switching block signal depending on the select control signal, which is applied at the second control module to prevent a resetting of the system clock hold signal.

11. The clock synchronization unit according to claim 10, wherein the first control module is designed to turn off the clock switching block signal when a predefined time threshold is reached.

12. The clock synchronization unit according to claim 11, wherein the time threshold is predefined by a user and/or by software, wherein the time threshold is at least $2 \cdot T_p + T_s$, where $T_p$ designates a cycle duration of the first clock signal and $T_s$ a cycle duration of the second clock signal.

13. The clock synchronization unit according to claim 6, further comprising a multiplexer that are each functionally connected to the first and second inputs, which are designed to select the first and second clock signal, each from a plurality of clock signals.

14. A processor unit, particularly a microprocessor, with a clock synchronization unit according to claim 6.

15. Use of the method according to claim 1 for switching of the system clock in a processor unit or a microprocessor.

* * * * *